United States Patent [19]

Masoomian

[11] Patent Number: 5,368,726
[45] Date of Patent: Nov. 29, 1994

[54] APPARATUS FOR TREATING AND REGENERATING SPENT CAUSTIC

[75] Inventor: Stephen Z. Masoomian, Houston, Tex.

[73] Assignee: Stone & Webster Engineering Corp., Boston, Mass.

[21] Appl. No.: 112,419

[22] Filed: Aug. 27, 1993

Related U.S. Application Data

[62] Division of Ser. No. 910,214, Jul. 9, 1992, Pat. No. 5,268,104.

[51] Int. Cl.$^5$ ............................. C02F 1/20; C02F 1/78
[52] U.S. Cl. ................................. 210/188; 210/195.1; 210/195.2; 210/202; 210/203; 210/206; 210/321.83; 422/186.3
[58] Field of Search ...................... 210/167, 188, 195.1, 210/195.2, 199, 202, 203, 205, 206, 257.1, 258, 259, 321.83, 638; 422/186.3

[56] References Cited

U.S. PATENT DOCUMENTS

| | | | |
|---|---|---|---|
| 2,665,249 | 1/1954 | Zimmermann | 210/2 |
| 2,824,058 | 2/1958 | Zimmermann | 210/63 |
| 3,761,409 | 9/1973 | McCoy et al. | 210/63 |
| 3,963,611 | 6/1976 | Dardenne-Ankringa, Jr. | 210/63 |
| 4,000,065 | 12/1976 | Ladha et al. | 210/23 |
| 4,066,543 | 1/1978 | McCoy | 210/63 |
| 4,176,057 | 11/1979 | Wheatley et al. | 210/23 |
| 4,179,365 | 12/1979 | Sumi | 210/8 |
| 4,230,571 | 10/1980 | Dadd | 210/760 |
| 4,347,144 | 8/1982 | Bodenbenner et al. | 210/761 |
| 4,347,226 | 8/1982 | Audeh et al. | 423/207 |
| 4,350,599 | 9/1982 | Chowdhury | 210/761 |
| 4,372,940 | 2/1983 | Brandenburg et al. | 423/567 |
| 4,417,986 | 11/1983 | Connaught et al. | 210/759 |
| 4,584,107 | 4/1986 | Odaka et al. | 210/760 |
| 4,746,434 | 5/1988 | Grieves et al. | 210/610 |
| 4,793,931 | 12/1988 | Stevens et al. | 210/636 |
| 4,826,605 | 5/1989 | Doble et al. | 210/721 |
| 4,849,114 | 7/1989 | Zeff et al. | 210/747 |
| 4,948,511 | 8/1990 | Swanson et al. | 210/634 |
| 5,024,766 | 6/1991 | Mahmud | 210/748 |
| 5,116,509 | 5/1992 | White | 210/748 |
| 5,178,755 | 1/1993 | LaCrosse | 210/743 |

FOREIGN PATENT DOCUMENTS

| | | |
|---|---|---|
| 0313489 | 4/1989 | European Pat. Off. |
| 669091 | 3/1952 | United Kingdom |
| 812648 | 4/1959 | United Kingdom |

OTHER PUBLICATIONS

"Ridding Process Waters and Caustic Solutions of Sulfides" by A. G. Smith; Jul. 9, 1956 pp. 95–99.
"New Column Removes Sulfide With Air" by Janice D. Martin and L. D. Levanas; May 1962, vol. 41, No. 5 pp. 149–153.
"A Plant for the Oxidation of Sulphide-Containing Refinery Wastes by Air" by Otto Abeg; Oct. 18, 1960.
"Plant for the Oxidation of Sulphide-Containing Refinery Wastes by Air" by Otto Abegg and Johannes Elster; Petrochemie Sep. 1962.
Proceedings of the 42nd Industrial Waste Conference May 12, 13, 14, 1987 Purdue University, West Lafayette, Indiana; "Spent Caustic Treatment and Disposal" by Yi-Shan Chen.
"Petroleum Refinery Industry" Energy Saving and Environmental Control by Sitting M. copyright 1978.
"Wet Air Oxidation of Hazardous Organics in Wastewater" by Dietrich et al. Aug., 1985; Environmental Process vol. 4, No. 3 pp. 171–177.
"Pulse Radiolysis of Aqueous Sulfite Solutions" by Zagorski et al., The Journal of Physical Chemistry vol. 75, No. 23, Nov. 23, 1971 pp. 3510–3517.
"Evolution of the Ozone/UV Process for Eastwater Treatment" by H. William Prengle, Jr.; Sep., 1977.

*Primary Examiner*—Neil McCarthy
*Attorney, Agent, or Firm*—Hedman, Gibson & Costigan

[57] ABSTRACT

The present invention relates to an apparatus for treating and regenerating a spent caustic solution at ambient temperatures which includes means for oxidizing the spent caustic stream with an air/ozone gas mixture, followed by irradiating the oxidized spent caustic stream with a broad range of ultraviolet radiation and finally filtering the spent caustic solution.

15 Claims, 2 Drawing Sheets

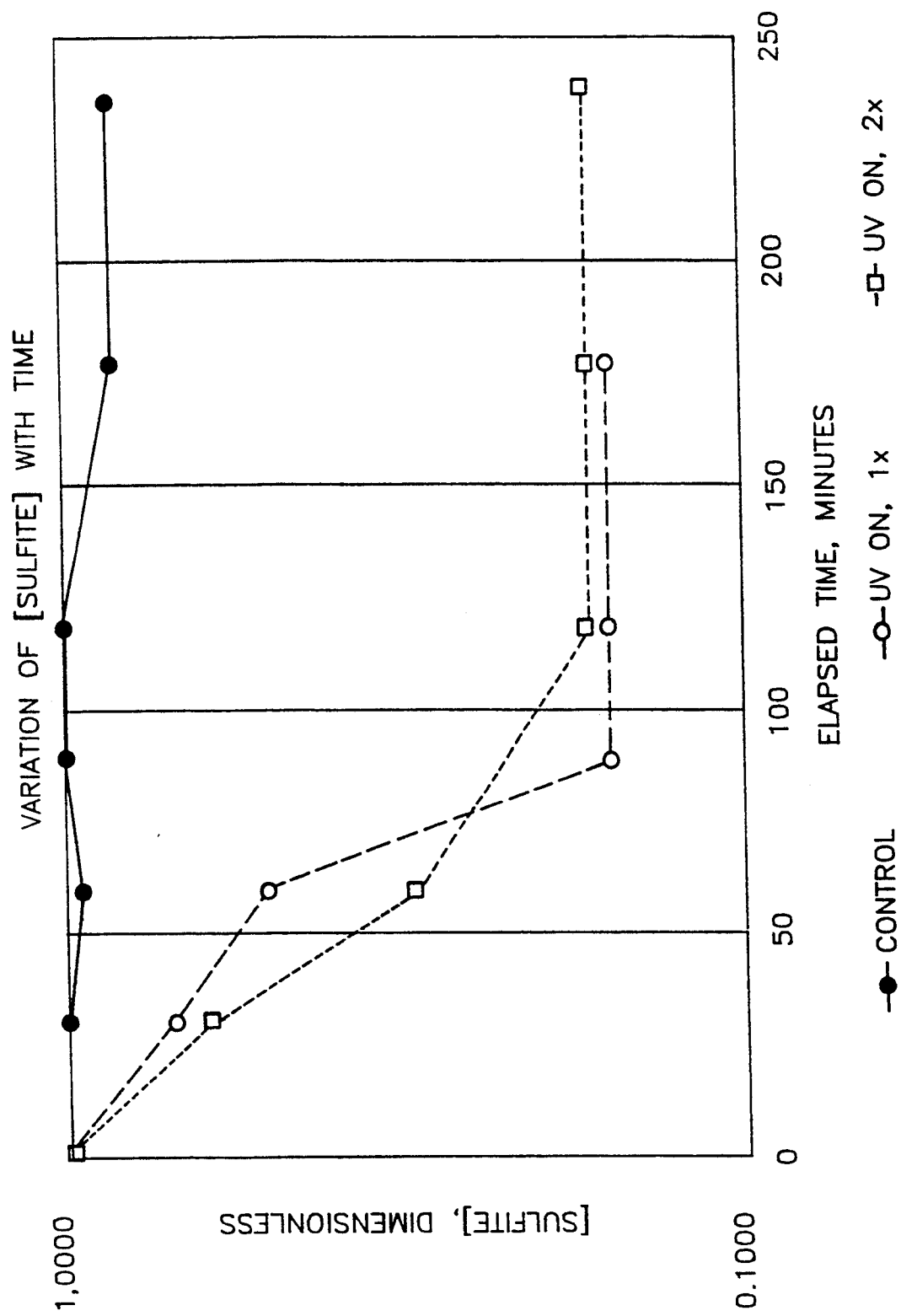

APPARATUS FOR TREATING AND REGENERATING SPENT CAUSTIC

This is a divisional of application Ser. No. 07/910,214, filed Jul. 9, 1992, now U.S. Pat. No. 5,268,104.

FIELD OF THE INVENTION

This invention relates to an improved process for treating effluent containing organic and inorganic impurities. More particularly, the invention relates to a multi-stage process arranged to synergistically treat a caustic containing solution which provides an environmentally acceptable liquid for discharge into the environment and regeneration of the caustic solution.

BACKGROUND OF THE INVENTION

It has become essential to scrub gases produced in various hydrocarbon cracking processes to remove various contaminants. For example, flue gases generated in the production of ethylene are scrubbed with an aqueous sodium hydroxide solution to remove hydrogen sulfide, carbon monoxide and other impurities. As a result, the gaseous product stream is relatively clean, however, the treatment results in a liquid contaminated with the various impurities removed from the gaseous product stream.

A great deal of attention has been paid to treating the liquid effluent resulting from the caustic treatment of flue gases to provide an environmentally acceptable effluent for discharge into the environment.

One approach has been to oxidize sulfides and other inorganic sulfur acid salts in an alkaline solution to both thiosulfate ions and sulfate ions. The process typically used is referred to as a wet air oxidation (WAO) process in which gaseous oxygen in the form of fine bubbles is contacted with the spent caustic effluent in contacting columns for relatively long periods of time.

Chemical reagent oxidation (CRO) of sulfide-containing effluents has also been proposed as illustrated in U.S. Pat. No. 4,417,986 and U.S. Pat. No. 4,584,107 which teach the use of hydrogen peroxide and ozone in the treatment of spent caustic effluents.

Various other approaches to the treatment of water containing impurities have also been proposed. For example, the oxidizing of toxic compounds by using a combination of ozone, hydrogen peroxide and ultraviolet radiation has been proposed as illustrated in U.S. Pat. No. 4,849,114.

Similarly, mechanical separation methods employing ultrafiltration membranes have been used to separate solids and various high molecular weight compounds from effluents.

Combinations of the various processes have also been attempted with varying results.

However, a means to treat a spent caustic effluent to achieve an environmentally acceptable discharge product and regenerate the caustic solution has not yet been developed.

SUMMARY OF THE INVENTION

As a result, the present invention provides a process for synergistically treating a spent caustic effluent to provide an environmentally safe discharge and to effect regeneration of the caustic solution.

It is an object of the present invention to provide a process for treating spent caustic effluent at ambient temperatures.

It is a further object of this invention to provide a process for the regeneration of a spent caustic solution.

To this end, the subject invention proceeds by the treatment of contaminated caustic effluent in a multi-stage process after the removal of dispersed oil from the spent caustic effluent. Initially, the spent caustic effluent is subjected to air/ozonation oxidation in a batch type, or co-current or countercurrent column type reactor followed by ultraviolet radiation, and finally nanofiltration.

BRIEF DESCRIPTION OF THE DRAWINGS

FIG. 2 is a graphical representation of the effect of ultraviolet radiation in the range of 185 nm to 300 nm on the sulfite ion in comparison to the effects on the sulfite ion in the absence of such ultraviolet radiation.

DETAILED DESCRIPTION OF THE INVENTION

Figure 1:
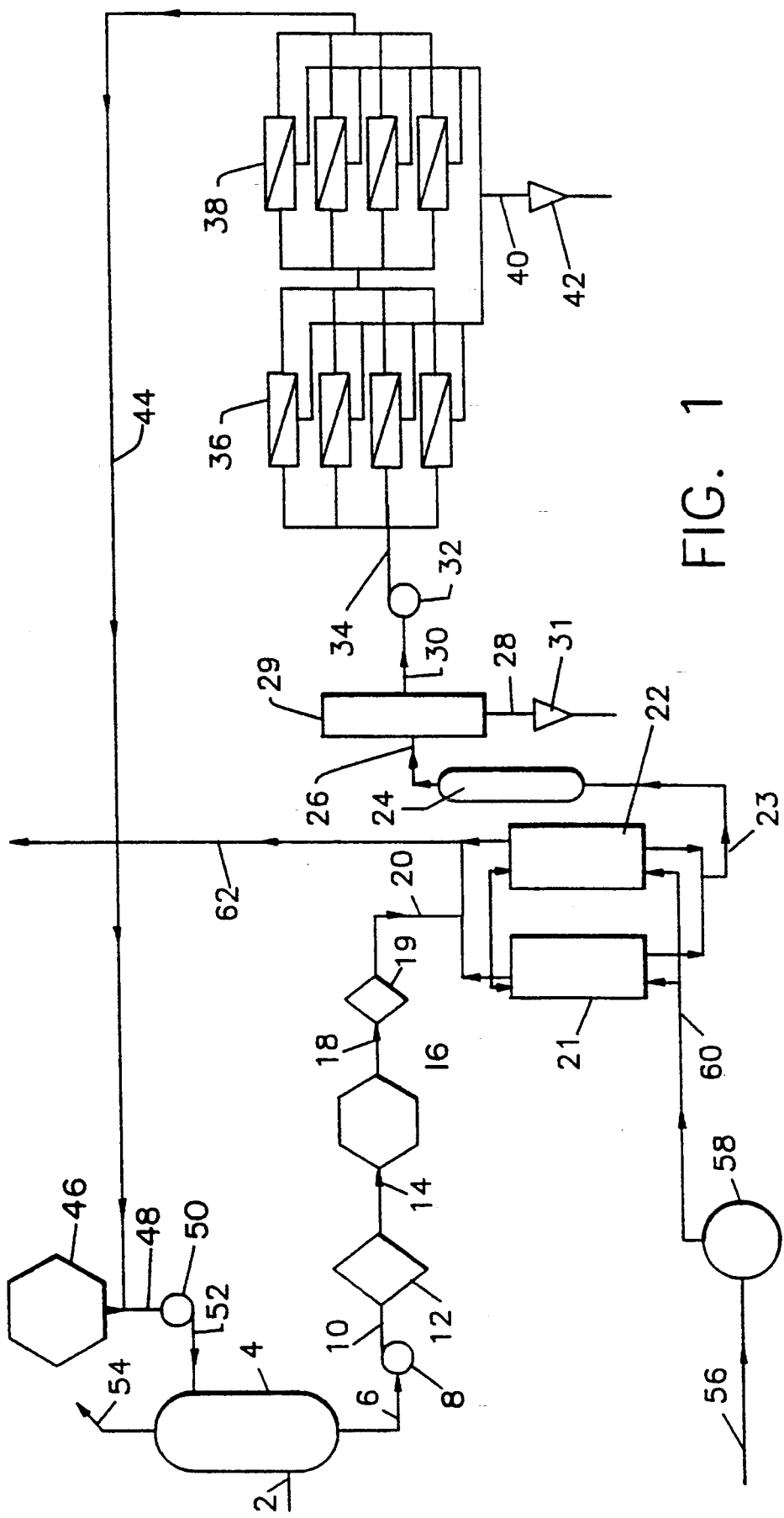
FIG. 1 is a schematic diagram of a preferred version of the invention.

The process of the subject invention has application in virtually any environment in which a fluid is to be treated for the removal of impurities. However, the process will be described in the environment of an ethylene plant.

As seen in FIG. 1, the process of the present invention is a multi-step process which, in its most basic format, treats at ambient temperatures an effluent containing both inorganic and organic contaminants by first subjecting the effluent to a dispersed oil removal step, followed by an air/ozone oxidation step, an ultraviolet radiation step and finally a filtration step. This arrangement produces a synergistic effect that results in a treated effluent that is environmentally safe.

Referring to FIG. 1, sour process gas from an ethylene plant flows into a caustic treatment tower 4 by line 2. The sour process gas is absorbed of harmful and environmentally unacceptable components in the caustic treatment tower 4. Clean or sweet process gas is discharged from the caustic treatment tower 4 by line 54.

The caustic solution containing the harmful components from the sour process gas is removed from the caustic treatment tower 4 by line 6. The composition of the spent caustic solution as it leaves the caustic treatment tower 4 through line 6 is water, sodium hydroxide, sodium carbonate, sodium sulfide, oil, benzene, substituted aromatics, dienes, and aliphatics.

From line 6 the spent caustic solution is pumped into a gasoline mixing drum 12 via line 10 by a caustic treatment pump 8. The spent caustic solution flows from the gasoline mixing drum 12 to a deoiling drum 16 by line 14. The spent caustic solution flows from the deoiling drum 16 through line 18 to a degassing drum 19. The gasoline mixing drum 12, deoiling drum 16 and degassing drum 19 remove 70–100% of dispersed oil that may have been transferred to the spent caustic solution by the sour process gas. The gasoline mixing drum 12, deoiling drum 16 and degassing drum 19 are standard type drums available from any local fabricator of such equipment.

The spent caustic solution flows from the degassing drum 19 through line 20 to a reactor vessel 21 or 22. The reactor vessels 21 and 22 may either be a continuous column type vessel or a batch type vessel. The preferred embodiment employs a batch type vessel which is obtainable from any vessel fabricator.

The spent caustic solution is treated in the reactor vessels 21 or 22 at the ambient temperature of approximately 80° F. to 120° F. with an air/ozone mixture. The preferred amount of ozone supplied to batch reactor vessel 21 or 22 is roughly 1 lb of ozone per 1 lb of TOC (total organic content) and 0.6 lb of ozone per 1 lb of sodium sulfide (the major contributor to the Chemical Oxygen Demand or COD) in the spent caustic solution.

The air/ozone mixture is supplied to the reactor vessels 21 and 22 by line 60. The air for the mixture is supplied by line 56 and the ozone is supplied by the ozone generator 58.

The gas from the reactor vessels 21 and 22 is vented by line 62 to either a stack discharge, or to VOC (volatile organic content) treatment and/or ozone destruction if required.

After the spent caustic is oxidized with the air/ozone mixture, it is subjected to ultraviolet radiation, further oxidizing the harmful components of the spent caustic solution. The spent caustic solution can be subjected to ultraviolet radiation while it is in the reactor vessels 21 or 22, either after the spent caustic solution is oxidized by the air/ozone mixture or concurrently with the application of the air/ozone oxidation. In the preferred embodiment, the spent caustic solution leaves the reactor vessels 21 and 22 by line 23 after being contacted with the air/ozone mixture and is subjected to ultraviolet radiation in a separate ultraviolet reactor 24. The preferred ultraviolet radiation source is comprised of a vessel having a centrally disposed hermetically sealed and grounded quartz sleeve surrounded in a spaced relationship by a non-grounded metal sleeve. An annulus is provided between the quartz sleeve and the metal sleeve for the passage of effluent issuing from the reactor vessels 21 and 22. Centrally disposed within the quartz sleeve is a conventional electrode immersed in a xenon gas mixture. This ultraviolet generating assembly produces a broad spectrum of emission, generally between 185 nm to 300 nm, instead of a point spectrum of 254 nm as with a conventional glass ultraviolet generating system. An illustrative ultraviolet radiation system is commercially available from EEG, Inc., Salem, Mass.

This ultraviolet radiation system serves to increase the conversion rate of the unwanted sulfite ion to the acceptable sulfate ion. Furthermore, it has the overall effect of rapidly polishing or driving the oxidation reactions toward completion in the spent caustic solution which were initiated by the air/ozone mixture.

After the spent caustic solution is subjected to the air/ozone oxidation step and the ultraviolet radiation step, all the inorganics in the spent caustic solution should be oxidized to their highest oxidation state. The composition of the spent caustic solution at this stage of the process is roughly sodium hydroxide, sodium carbonate, sodium sulfate and some carbonyls. All the dispersed oil, aromatics, sulfides and thiosulfates will have been substantially oxidized or removed and the COD (chemical oxygen demand) will have been reduced by about 85-90%.

After the harmful components of the spent caustic solution have been subjected to the air/ozone oxidation step and the ultraviolet radiation step, the spent caustic flows through line 26 to the beginning of the filtration step of the process. The first phase of the filtration step consists of a ten micron filter 29 which removes any suspended solids in the spent caustic solution. The suspended solids leave the filter 29 by line 28 to a collection area 31.

The spent caustic solution flows from the ten micron filter 29 through line 30 to a high pressure pump 32, then through line 34 to two separate nanofiltration banks 36 and 38, arranged in series. Each nanofiltration bank contains a plurality of membranes comprised of spirally wound or multi-stage nanofiltration membranes designed for the separation of ionic species. Ionic separation in the nanofiltration banks 36 and 38 is aided by the use of a polymer coating on the membranes that has an electric charge in its pore structure. The solvent water mixture used to spread the polymer coating on the membrane also has an electric charge. Therefore, it is believed the ionic separation occurs by size exclusion with the membrane, solubility with either the polymer or water, and/or electrical attractiveness with the membrane, polymer or water.

A particularly suitable nanofiltration assembly is manufactured by Desalination Systems, Inc., Escandido, Calif.

The first nanofiltration bank 36 removes less than 0.1% of the sodium hydroxide, 70-75% of the sodium carbonate, 95-100% of the dissolved solids with a molecular weight greater than 150 and 75-80% of the dissolved sulfur salts. The second nanofiltration bank 38 removes less than 0.1% of the sodium hydroxide, 95-100% of the sodium carbonate, 100% of the dissolved solids with a molecular weight greater than 150 and 75-80% of the dissolved sulfur salts.

The reject of the nanofiltration banks 36 and 38 flows through line 40 to collection area 42, where it is sent to a closed drain for transfer to the plant's wastewater treatment or is further concentrated by successive filtration for sale to the pulp and paper industries for use as a salt liquor or by evaporation for sale to the glass industry as salt cake. Alternatively the reject can be sent to a cooling tower basin as cooling water makeup provided the cooling tower chemical treatment is handled by slipstream ozonation.

The permeate of the nanofiltration banks 36 and 38 is the regenerated caustic solution and it flows through line 44 to line 48, which is downstream of the concentrated caustic tank 46. The regenerated caustic solution is mixed in line 48 with concentrated caustic from the concentrated caustic tank 46. The mixing in line 48 adjusts the concentration of the caustic in the regenerated caustic solution to approximately 8 percent by weight of NaOH before the regenerated caustic solution is returned to the caustic treatment tower 4. After the mixing, pump 50 pumps the regenerated caustic solution through line 52 to the caustic treatment tower 4 to begin the process again.

The following are the results obtained from a prophetic run of the above-described process.

The caustic treatment tower 4 has a volume of 37,000 gals. 355,000 lbs/hr of sour process gas enters the caustic treatment tower 4. Fresh caustic solution from line 52 enters the treatment tower 4 at a rate of 110,000 lbs./hr. in a counter current flow to the entering sour process gas. The concentration of the fresh caustic solution is approximately 8 weight percent NaOH in water.

18,000 lbs/hr of spent caustic solution is discharged from the caustic treatment tower 4 at a temperature between 80°-120° F. The spent caustic solution has the following composition:

| COMPONENT | LBS./HR. |
|---|---|
| OIL & GREASE | 3.6 |
| NaOH (sodium hydroxide) | 360.0 |
| $Na_2CO_3$ (sodium carbonate) | 306.0 |
| $Na_2S$ (sodium sulfide) | 3.6 |
| $Na_2SO_3$ (sodium sulfite) | 0.04 |
| $Na_2SO_4$ (sodium sulfate) | 0.004 |
| $Na_2S_2O_3$ (sodium thiosulfate) | 0.04 |
| BENZENE | 3.6 |
| TSS | 1.8 |

The spent caustic solution then enters the gasoline mixing drum 12, deoiling drum 16, and degassing drum 19 where 100% of the oil and grease is removed.

The spent caustic solution then proceeds to a batch reactor vessel 21 which has a volume of 9000 gallons. In the reactor 21, the spent caustic solution is treated with an air/ozone mixture having 99% air to 1% ozone. The mixture remains in the reactor vessel for 5 hours.

The composition of the spent caustic solution after being treated with the air/ozone mixture is:

| COMPONENT | LBS./HR. |
|---|---|
| OIL & GREASE | 0.036 |
| NaOH (sodium hydroxide) | 360.0 |
| $Na_2CO_3$ (sodium carbonate) | 306.0 |
| $Na_2S$ (sodium sulfide) | 0.0 |
| $Na_2SO_3$ (sodium sulfite) | 0.59 |
| $Na_2SO_4$ (sodium sulfate) | 5.3 |
| $Na_2S_2O_3$ (sodium thiosulfate) | 0.37 |
| BENZENE | 0.0 |
| TSS | 1.8 |

The spent caustic solution is subsequently subjected to ultraviolet radiation in a range of between 185 nm and 300 nm. The resulting composition of the spent caustic solution is:

| COMPONENT | LBS./HR. |
|---|---|
| OIL & GREASE | 0.036 |
| NaOH (sodium hydroxide) | 360.0 |
| $Na_2CO_3$ (sodium carbonate) | 306.0 |
| $Na_2S$ (sodium sulfide) | 0.0 |
| $Na_2SO_3$ (sodium sulfite) | 0.0 |
| $Na_2SO_4$ (sodium sulfate) | 6.67 |
| $Na_2S_2O_3$ (sodium thiosulfate) | 0.0 |
| BENZENE | 0.0 |
| TSS | 1.8 |

In the final phase of the process, the spent caustic stream passes through a ten micron filter 29 which removes 100% of the suspended solids and then into two nanofiltration banks 36 and 38 connected in series. The permeate from the first nanofiltration bank 36 has a composition of:

| COMPONENT | LBS./HR. |
|---|---|
| OIL & GREASE | 0.0 |
| NaOH (sodium hydroxide) | 359.0 |
| $Na_2CO_3$ (sodium carbonate) | 77.0 |
| $Na_2S$ (sodium sulfide) | 0.0 |
| $Na_2SO_3$ (sodium sulfite) | 0.0 |
| $Na_2SO_4$ (sodium sulfate) | 2.0 |
| $Na_2S_2O_3$ (sodium thiosulfate) | 0.0 |
| BENZENE | 0.0 |
| TSS | 0.0 |

The permeate from the second nanofiltration bank 38 has the following composition of:

| COMPONENT | LBS./HR. |
|---|---|
| OIL & GREASE | 0.0 |
| NaOH (sodium hydroxide) | 358.0 |
| $Na_2CO_3$ (sodium carbonate) | 2.0 |
| $Na_2S$ (sodium sulfide) | 0.0 |
| $Na_2SO_3$ (sodium sulfite) | 0.0 |
| $Na_2SO_4$ (sodium sulfate) | 0.5 |
| $Na_2S_2O_3$ (sodium thiosulfate) | 0.0 |
| BENZENE | 0.0 |
| TSS | 0.0 |

The permeate of the filtration step is the regenerated caustic solution and is sent by line 44 to line 48, where it is mixed with concentrated caustic from the concentrated caustic tank 46. The regenerated caustic solution is then pumped by pump 50 through line 52 to the caustic treatment tower 4 to begin the process again.

The reject from the nanofiltration banks 36 and 38 has the following composition:

| COMPONENT | LBS./HR. |
|---|---|
| OIL & GREASE | 0.0 |
| NaOH (sodium hydroxide) | 2.0 |
| $Na_2CO_3$ (sodium carbonate) | 304.0 |
| $Na_2S$ (sodium sulfide) | 0.0 |
| $Na_2SO_3$ (sodium sulfite) | 0.0 |
| $Na_2SO_4$ (sodium sulfate) | 6.17 |
| $Na_2S_2O_3$ (sodium thiosulfate) | 0.0 |
| BENZENE | 0.0 |
| TSS | 0.0 |

In a separate experiment, the effect of the quartz enclosed ultraviolet radiation source 24 on the sulfite ion was determined. In the first run, a control solution containing sulfite ions was periodically checked to determine the effect of time on the sulfite concentration of the solution. The results showed that after approximately two hundred and fifty minutes, the concentration of the sulfite ion was negligibly reduced.

In a second run, an aqueous sulfite solution was subjected to ultraviolet radiation from the quartz enclosed ultraviolet radiation source 24. The capacitance of the ultraviolet radiation source was five kilovolts. The results showed that after about 75 minutes the concentration of the sulfite ion had been reduced by about 50%.

In a third run, an aqueous sulfite solution was subjected to ultraviolet radiation from the quartz-enclosed ultraviolet radiation source 24 where the radiation was produced with double the capacitance of the second run or ten kilovolts. The results show that after approximately 60 minutes the concentration of the sulfite ion had been reduced by about 50%.

The results of these runs are shown in graphical form in FIG. 2.

Many variations of the present invention will suggest themselves to those skilled in this art in light of the above-detailed description. All such obvious variations are within the full intended scope of the appended claims.

I claim:

1. A system for regenerating a spent caustic solution which comprises:
   (a) a caustic treatment tower;
   (b) a gasoline mixing drum, a deoiling drum and a degassing drum for the removal of residual dispersed oil from the spent caustic solution before the spent caustic solution enters a reactor vessel;

(c) a reactor vessel for oxidizing the spent caustic solution from the caustic treatment tower with an air/ozone gas mixture;

(d) an ultraviolet radiation source for radiating the oxidized spent caustic with a range of radiation of 185 nm to 300 nm;

(e) a nanofiltration means for filtering the radiated spent caustic; and (f) a means for pumping the spent caustic solution throughout the regenerating system.

2. A system as defined in claim 1 further comprising a concentrated caustic tank which supplies concentrated caustic to the regenerated spent caustic solution before it returns to the caustic treatment tower.

3. A system as defined in claim 1 wherein the reactor vessel is a batch type reactor vessel.

4. A system as defined in claim 1, wherein the reactor vessel is a continuous column type reactor.

5. A system as defined in claim 1 wherein the ultraviolet radiation source is a hermetically sealed quartz sleeve surrounded in a spaced relationship by a non-grounded metal sleeve, forming an annulus between the quartz sleeve and the metal sleeve for passage of the spent caustic solution and an electrode in a gas mixture within the quartz sleeve.

6. A system as defined in claim 5 wherein the gas mixture is a xenon-gas mixture.

7. A system as defined in claim 6, wherein the capacitance of the ultraviolet radiation source is ten kilovolts.

8. A system as defined in claim 1 wherein the nanofiltration means comprises a ten micron filter and a plurality of nanofiltration banks connected serially.

9. A system as defined in claim 8 wherein the nanofiltration banks comprise a plurality of spirally wound membranes which are designed for ionic specie separation by the addition of a polymeric coating to the membrane which has an electric charge in the pore structure.

10. A system for regenerating a spent caustic solution consisting essentially of:

(a) a caustic treatment tower;

(b) a means for removing residual dispersed oil from the spent caustic solution;

(c) a reactor vessel for oxidizing the spent caustic solution with an air/ozone mixture;

(d) a hermetically sealed, grounded quartz sleeve surrounded in a spaced relationship by a non-grounded metal sleeve forming an annulus between the quartz sleeve and the metal sleeve for passage of the spent caustic solution and an electrode in a gas mixture within the quartz sleeve for generating ultraviolet radiation in the range of 185 nm to 300 nm.;

(e) a ten micron filter to filter the radiated spent caustic;

(f) a plurality of serially connected nanofiltration banks which comprise a plurality of spirally wound membranes designed for ionic specie separation by the addition of a polymeric coating to the membrane which has an electric charge in the pore structure for filtering the filtrate of the ten micron filter;

(g) a concentrated caustic tank for adding concentrated caustic to the permeate of the nanofiltration banks to adjust the caustic concentration of the spent caustic solution before returning the regenerated caustic solution to the caustic treatment tower; and (h) a means for pumping the spent caustic solution throughout the regenerating system.

11. A system for regenerating a spent caustic solution as defined in claim 10, wherein the reactor vessel for oxidizing the spent caustic solution with an air/ozone mixture is a continuous column type reactor.

12. A system for regenerating a spent caustic solution as defined in claim 10, wherein the reactor vessel for oxidizing the spent caustic solution with an air/ozone mixture is a batch type reactor.

13. A system as defined in claim 10, wherein the capacitance of the ultraviolet radiation source is ten kilovolts.

14. A system for regenerating a spent caustic solution which comprises:

(a) a caustic treatment tower;

(b) a reactor vessel for oxidizing the spent caustic solution from the caustic treatment tower with an air/ozone gas mixture;

(c) an ultraviolet radiation source for radiating the oxidized spent caustic with a range of radiation of 185 nm to 300 nm;

(d) a nanofiltration means comprising a ten micron filter and a plurality of nanofiltration banks connected serially for filtering the radiated spent caustic; and (e) a means for pumping the spent caustic solution throughout the regenerating system.

15. A system as defined in claim 14 wherein the nanofiltration banks comprise a plurality of spirally wound membranes which are designed for ionic specie separation by addition of a polymeric coating to the membrane which has an electric charge in the pore structure.

* * * * *